(12) United States Patent
Ikazaki et al.

(10) Patent No.: US 10,712,979 B2
(45) Date of Patent: Jul. 14, 2020

(54) IMAGE FORMING APPARATUS, IMAGE FORMATION METHOD, AND STORAGE MEDIUM

(71) Applicant: KYOCERA Document Solutions Inc., Osaka (JP)

(72) Inventors: Akihiko Ikazaki, Osaka (JP); Shinichi Hashimoto, Osaka (JP); Kunihiko Shimamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/590,202

(22) Filed: Oct. 1, 2019

(65) Prior Publication Data
US 2020/0110558 A1 Apr. 9, 2020

(30) Foreign Application Priority Data
Oct. 9, 2018 (JP) ................. 2018-191118

(51) Int. Cl.
*G06F 3/12* (2006.01)
*G06F 12/02* (2006.01)

(52) U.S. Cl.
CPC ............ *G06F 3/122* (2013.01); *G06F 3/1204* (2013.01); *G06F 12/023* (2013.01)

(58) Field of Classification Search
CPC ....... G06F 3/122; G06F 3/1204; G06F 12/023
See application file for complete search history.

(56) References Cited

U.S. PATENT DOCUMENTS

2008/0291496 A1* 11/2008 Hara ...................... G06K 15/02
358/1.16
2009/0109486 A1* 4/2009 Kato ...................... G06F 3/122
358/1.16

FOREIGN PATENT DOCUMENTS

JP 2004-227390 A 8/2004

* cited by examiner

*Primary Examiner* — Quang N Vo
(74) *Attorney, Agent, or Firm* — Studebaker & Brackett PC (57) ABSTRACT

An image forming apparatus which implements a plurality of functions includes: storage with a prescribed storage area; an operating system which implements at least some of the functions by allocating a part of the prescribed storage area for a plurality of processes and executing the processes; and a storage area managing section which predicts an amount of consumed memory in response to generation of a job and determines whether or not the amount of consumed memory is allocable to the job in the prescribed storage area. The job is a processing target for the image forming apparatus. The amount of consumed memory is used for processing the job by the image forming apparatus. When determining that the amount of consumed memory is not allocable, the storage area managing section ends at least one process which is not used to process the job to make the amount of predicted memory allocable.

7 Claims, 6 Drawing Sheets

Areas of main memory (post-RI processing)

FIG. 4A

Areas of main memory (post-RI processing restart)

IMAGE FORMING APPARATUS, IMAGE FORMATION METHOD, AND STORAGE MEDIUM

INCORPORATION BY REFERENCE

The present application claims priority under 35 U.S.C. § 119 to Japanese Patent Application No. 2018-191118, filed on Oct. 9, 2018. The contents of this application are incorporated herein by reference in their entirety.

BACKGROUND

The present disclosure relates to an image forming apparatus, an image formation method, and a storage medium, and particularly relates to memory management.

In recent years, an image forming apparatus uses larger amounts of memory as image resolution and number of functions increase. At the same time, because the image forming apparatus is shared by multiple users in an office and can process various jobs in parallel such as copying, printing, and image data transmission, a large amount of memory is sometimes temporarily consumed due to parallel processing. In addition, the image forming apparatus is vulnerable to a memory leak due to being required to process a large number of jobs from the users. To address such a problem, a technique is offered, for example, by which erratic printing including missing or garbled characters is prevented by detecting capacity of a storage area which can be used as a spool area and displaying a printability message. This technique is implemented in a personal computer which transmits a print job to the image forming apparatus.

SUMMARY

An image forming apparatus according to an aspect of the present disclosure implements a plurality of functions. The image forming apparatus includes storage, an operating system, and a storage area managing section. The storage has a prescribed storage area. The operating system implements at least some of the functions by allocating a part of the prescribed storage area for a plurality of processes and executing the processes. The storage area managing section predicts an amount of consumed memory in response to generation of a job and determines whether or not the amount of consumed memory is allocable to the job in the prescribed storage area. The job is a processing target for the image forming apparatus. The amount of consumed memory is an amount of memory used for processing the job by the image forming apparatus. When determining that the amount of consumed memory is not allocable, the storage area managing section ends at least one process which is not used to process the job among the processes to make the amount of consumed memory allocable.

An image forming method according to an aspect of the present disclosure is for implementing a plurality of functions using storage with a prescribed storage area. The image formation method includes: implementing at least some of the functions by allocating a part of the prescribed storage area for a plurality of processes and executing the processes; predicting an amount of consumed memory in response to generation of a job, the amount of consumed memory being an amount of memory used by the image forming method to process the job, the job being a processing target for the image forming method; and determining whether or not the amount of consumed memory is allocable to the job in the prescribed storage area. The determining includes, when the amount of consumed memory is determined not to be allocable, ending at least one process which is not used to process the job among the processes to make the amount of consumed memory allocable to the job.

A non-transitory computer-readable storage medium according to an aspect of the present disclosure stores an image forming program for controlling an image forming apparatus which includes storage with a prescribed storage area and implements a plurality of functions. The image forming program causes the image forming apparatus to function as an operating system and a storage area managing section. The operating system implements at least some of the functions by allocating a part of the prescribed storage area for a plurality of functions and executing the processes. The storage area managing section predicts an amount of consumed memory in response to generation of a job and determines whether or not the amount of consumed memory is allocable to the job in the prescribed storage area. The job is a processing target for the image forming apparatus. The amount of consumed memory is an amount of memory used by the image forming apparatus for processing the job. When determining that the amount of consumed memory is not allocable, the storage area managing section ends at least one process which is not used to process the job among the processes to make the amount of consumed memory allocable to the job.

DETAILED DESCRIPTION

The following describes a configuration for implementing the present disclosure (referred to in the following as an "embodiment") with reference to the drawings.

Figure 1:
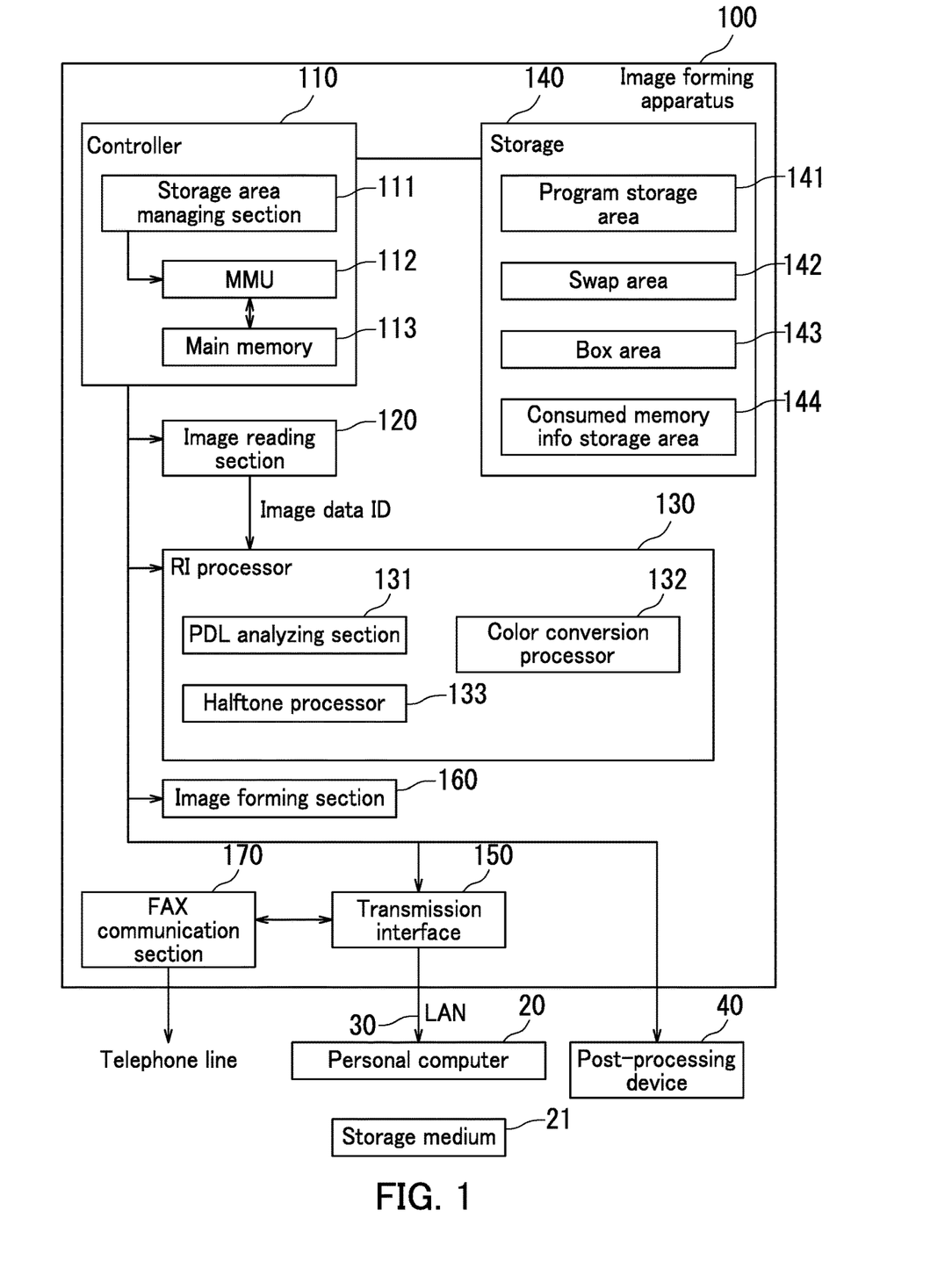
FIG. 1 is a general configuration diagram illustrating an image forming apparatus according to an embodiment of the present disclosure.

FIG. 1 is a general configuration diagram illustrating an image forming apparatus 100 according to an embodiment of the present disclosure. The image forming apparatus 100 includes a controller 110, an image reading section 120, a raster image (RI) processor 130, storage 140, a transmission interface 150 (also called a transmission I/F), an image forming section 160, and a facsimile (FAX) communication section 170. The RI processor 130 includes a page description language (PDL) analyzing section 131, a color conversion processor 132, and a halftone processor 133. The image reading section 120 reads an image from a document and generates image data ID which is digital data. The RI processor 130 executes RI processing on the image data to generate dot data which is bitmap data. The FAX communication section 170 executes transmission and reception of a FAX. Binarization is executed in transmission of a FAX.

The image forming apparatus 100 is connected to a personal computer 20 through a local area network (LAN) 30. The image forming apparatus 100 is connected to a post-processing device 40. The post-processing device 40 can execute post-processing on printing paper on which an image has been formed. The post-processing includes punching processing, stapling processing, and alignment processing by which a sheaf of the printing paper is aligned.

The image forming section 160 forms an image on a printing medium (not illustrated) based on the dot data and ejects the printing medium. In the present embodiment, the image forming section 160 forms an image on the printing medium (not illustrated) based on the image data ID or a print job received from the personal computer 20 and ejects the printing medium. The dot data is bitmap data representing a state of dots formed on an image formation medium. The printing medium is also called an image formation medium. The print job is also called an image formation job.

The controller 110 includes a control section such as a central processing unit (CPU). The controller 110 has control functions related to an interface such as various input/output (I/O), Universal Serial Bus (USB), bus, or other hardware. The controller 110 controls an entirety of the image forming apparatus 100. In this example, the controller 110 is assumed to operate using a LINUX (registered trademark) kernel as an operating system.

The controller 110 includes a storage area managing section 111, a memory management unit (MMU) 112, and main memory 113 with a prescribed storage area. The main memory 113 is composed of random-access memory (RAM). The CPU executes each instance of processing using a storage area secured by the storage area managing section 111 in the main memory 113. The MMU 112 has a function of converting a virtual address to a physical address.

The storage 140 is a storage device including a hard disk drive which is a non-transitory and non-volatile storage medium. The storage 140 has a program storage area 141, a swap area 142, a box area 143, and a consumed memory information storage area 144. The program storage area 141 stores therein an image forming program for executing each process executed by the controller 110. The image forming program may be installed in the program storage area 141 from a storage medium 21 such as a Secure Digital (SD) card or USB memory. The swap area 142 is an area secured in advance for swapping out data of the main memory 113. The box area 143 is an area secured in advance for a user of the image forming apparatus 100 to save image data and other data. The consumed memory information storage area 144 is an area in which information is stored representing an amount of memory consumed by each function such as a printing function or a copy function.

Figure 2:
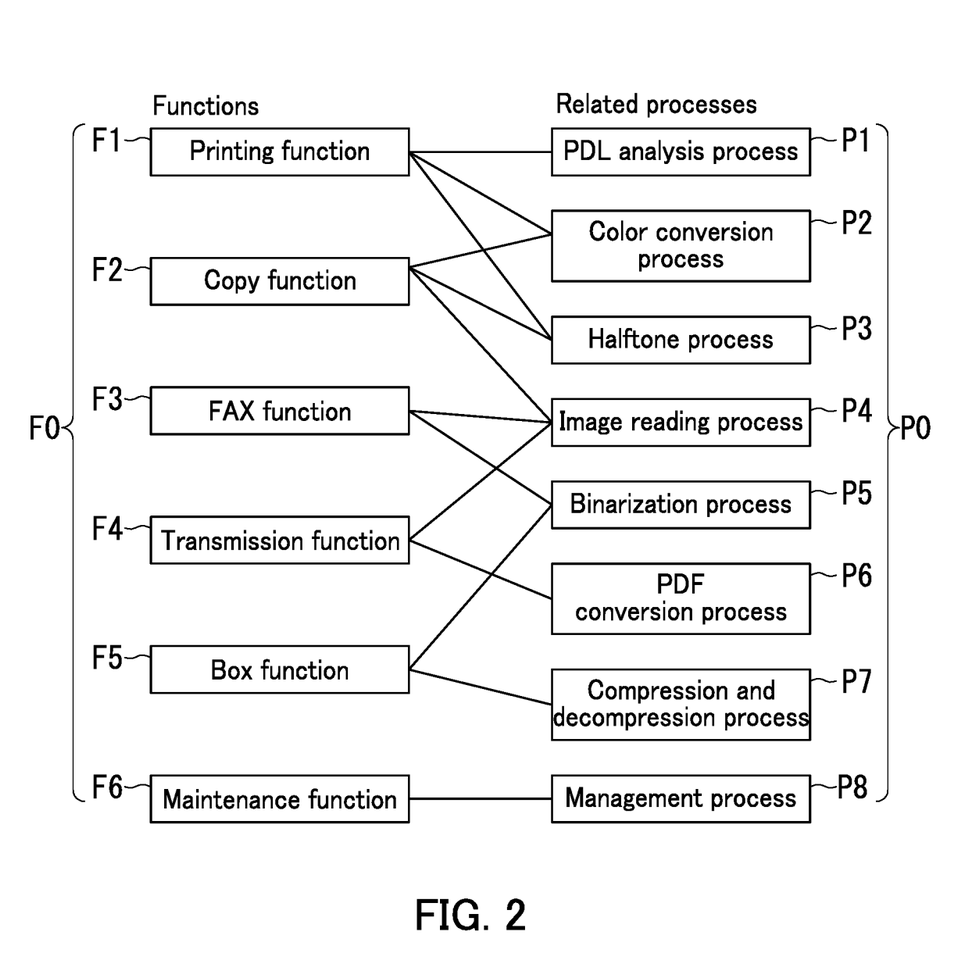
FIG. 2 is a descriptive diagram illustrating relationships between functions and processes of the image forming apparatus according to the embodiment.

FIG. 2 is a descriptive diagram illustrating a relationship between each function F0 and each process P0 of the image forming apparatus 100 according to the embodiment. The image forming apparatus 100 has a printing function F1, a copy function F2, a FAX function F3, a transmission function F4, a box function F5, and a maintenance function F6 as main functions F0, and implements a plurality of processes P0 for implementing the functions F0. The printing function F1 is implemented by a PDL analysis process P1, a color conversion process P2, and a halftone process P3. The copy function F2 is implemented by an image reading process P4, the color conversion process P2, and the halftone process P3. The image reading process P4 and a binarization process P5 are used in the FAX function F3.

In this example, the transmission function F4 is a function of reading an image and sending the image to the personal computer 20 as a Portable Document Format (PDF) file. The transmission function F4 uses the image reading process P4 and a PDF conversion process P6. The box function F5 is a function of compressing data such as image data and storing the data in the box area 143, and reading out from the box area 143 and decompressing the data. The image reading process P4 and a compression and decompression process P7 are used in the box function F5. In this example, the maintenance function F6 is a function of recording a state of a remaining consumable (e.g., toner) or a printed sheet count, and transmitting the recorded state to a support center. A management process P8 is used in the maintenance function F6.

Figure 3A:
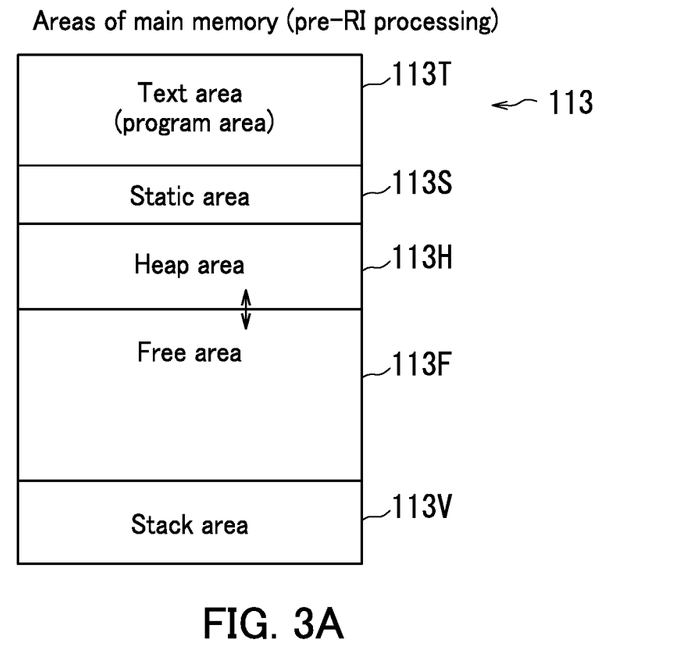
FIG. 3A is a descriptive diagram illustrating an example of a state of each area of main memory of the image forming apparatus according to the embodiment.
Figure 3B:
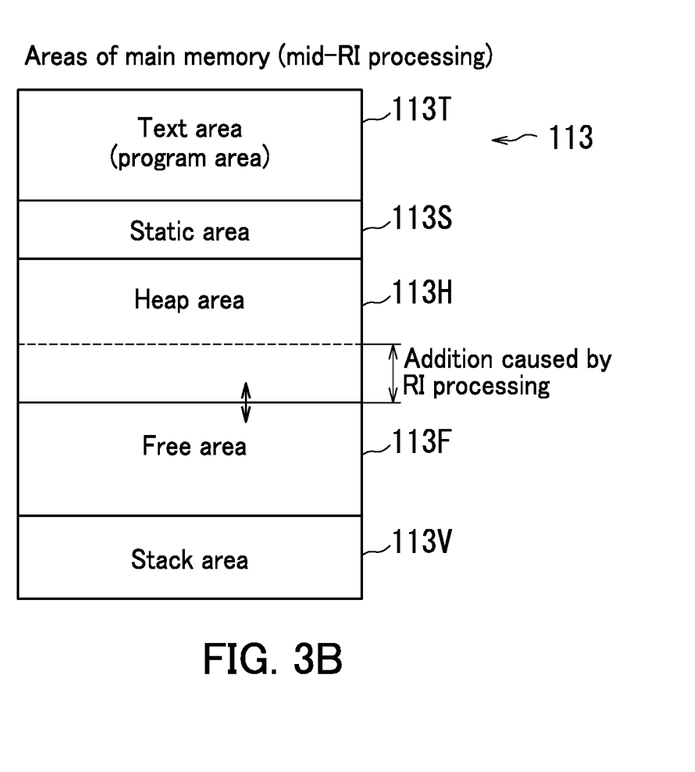
FIG. 3B is a descriptive diagram illustrating another example of the state of each area of the main memory of the image forming apparatus according to the embodiment.

FIGS. 3A and 3B are descriptive diagrams each illustrating an example of a state of each area of the main memory 113 of the image forming apparatus 100 according to the embodiment. The main memory 113 includes a text area 113T, a static area 113S, a heap area 113H, a free area 113F, and a stack area 113V.

The text area 113T is also called a program area and is a fixed-size area in which a program translated into machine language is stored. During startup, the image forming apparatus 100 reads out the program translated into machine language from the program storage area 141 and stores the program in the text area 113T. The processes P0 operate according to instructions in the machine language executed by the CPU.

The static area 113S is a fixed-size area in which static variables such as global variables are stored. The static variables are variables which do not change during operation of the processes P0. The stack area 113V is a fixed-size area in which temporary variables such as automatic variables (local variables), arguments of functions, or return values are stored. CPU registers can also be temporarily saved in the stack area 113V.

The heap area 113H is a dynamic area in which, in the C programming language for example, the processes can secure physical memory using a malloc function and can release physical memory using a free function. The processes P0 secure a storage area necessary for the operation thereof from the physical memory using the malloc function and release the physical memory using the free function after the operation has completed. By contrast, the free area 113F is an area excluding the area secured in the heap area 113H. Accordingly, the heap area 113H and the free area 113F are areas which change according to the operation of the processes P0 (refer to the arrow in FIGS. 3A and 3B).

Note that a large part of the free area 113F is actually used by the LINUX (registered trademark) kernel of the controller 110 for buffering and file caching. However, the LINUX (registered trademark) kernel can automatically release the storage area used for buffering and file caching in response to a reduction in the free area 113F, thus increasing a usable storage area and making the storage area available to the processes P0. However, the storage area used for buffering or file caching is secured in a range in which the processing capacity of the controller 110 is not excessively reduced.

Furthermore, the LINUX (registered trademark) kernel can swap out to the swap area 142 of the storage 140 when the storage area used for buffering or file caching has decreased, thus increasing the usable storage area and making the storage area available to the processes P0. However, swapping out may cause a reduction in the processing capacity of the controller 110 because the storage 140 is a storage device including a hard disk drive.

FIG. 3A illustrates each area of the main memory 113 before the RI processing begins. The text area 113T, the static area 113S, and the stack area 113V are fixed-size areas during the operation of the processes P0. In this example, it is assumed that the programs of all the processes P0 are stored in the text area 113T and all the processes P0 are activated. The processes P0 have secured the storage area necessary to start processing in the heap area 113H. The RI processing is started in response to reception of a print job from the personal computer 20 or a copy operation.

FIG. 3B illustrates each storage area of the main memory 113 during the RI processing. In the RI processing, the controller 110 activates at least the color conversion process P2 and the halftone process P3. The color conversion process P2 and the halftone process P3 are operated through repetition of securing a storage area necessary for the processing using the malloc function and releasing the storage area using the free function. As such, the heap area 113H is increased by the RI processing.

Figure 4A:
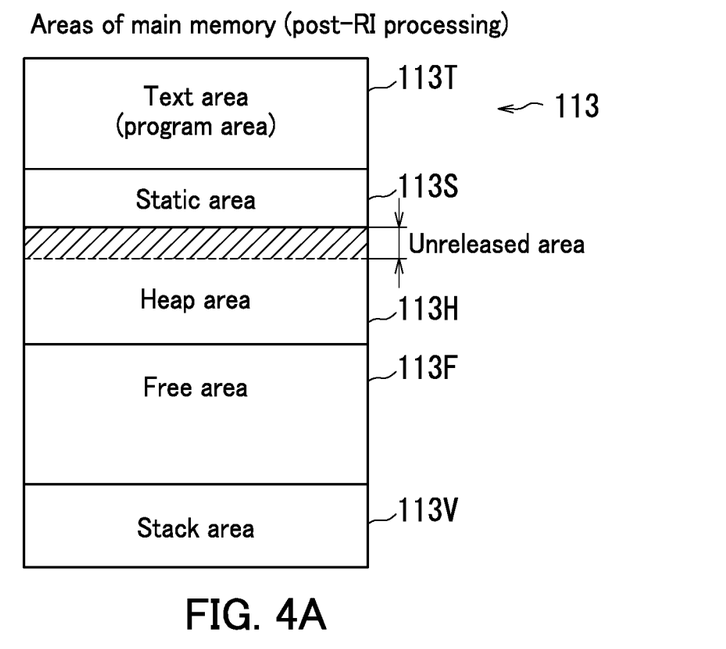
FIG. 4A is a descriptive diagram illustrating yet another example of the state of each area of the main memory of the image forming apparatus according to the embodiment.
Figure 4B:
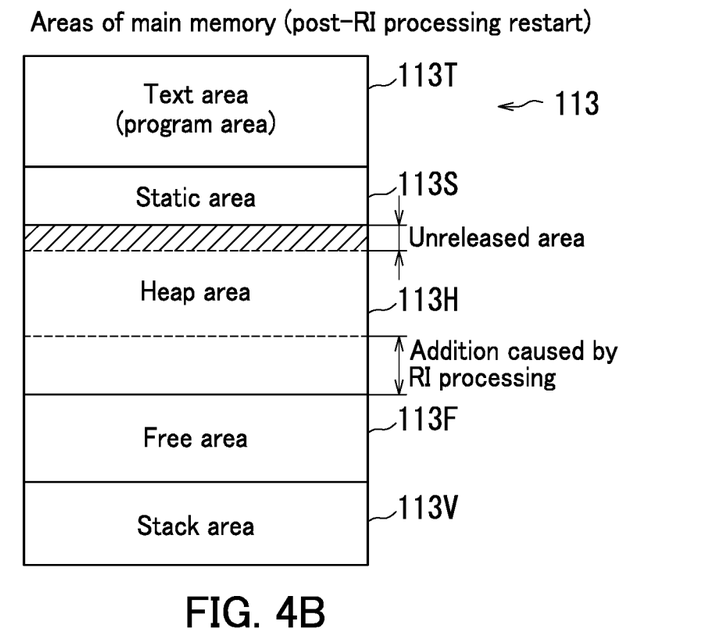
FIG. 4B is a descriptive diagram illustrating an additional example of the state of each area of the main memory of the image forming apparatus according to the embodiment.

FIGS. 4A and 4B are descriptive diagrams each illustrating another example of a state of each area of the main memory 113 of the image forming apparatus 100 according to the embodiment. FIG. 4A illustrates each area of the main memory 113 after the RI processing. The post-RI processing main memory 113 differs from the pre-RI processing main memory 113 (refer to FIG. 3A) in that an unreleased area remains and the storage area of the main memory 113 has been reduced. Occurrence of such an unreleased area is generally called a memory leak. Memory leaks are abated by garbage collection, but limitations to garbage collection have been identified.

FIG. 4B illustrates each area of the main memory 113 after the RI processing restarts. In the RI processing, the color conversion process P2 and the halftone process P3 are operated through repetition of securing a storage area necessary for the processing using the malloc function and releasing the storage area using the free function. However, the free area 113F is reduced due to an unreleased area caused by a memory leak. Because the image forming apparatus 100 is required to process a large number of jobs from multiple users, the present inventors have focused on a fact that a memory leak is not ignorable.

Figure 5:
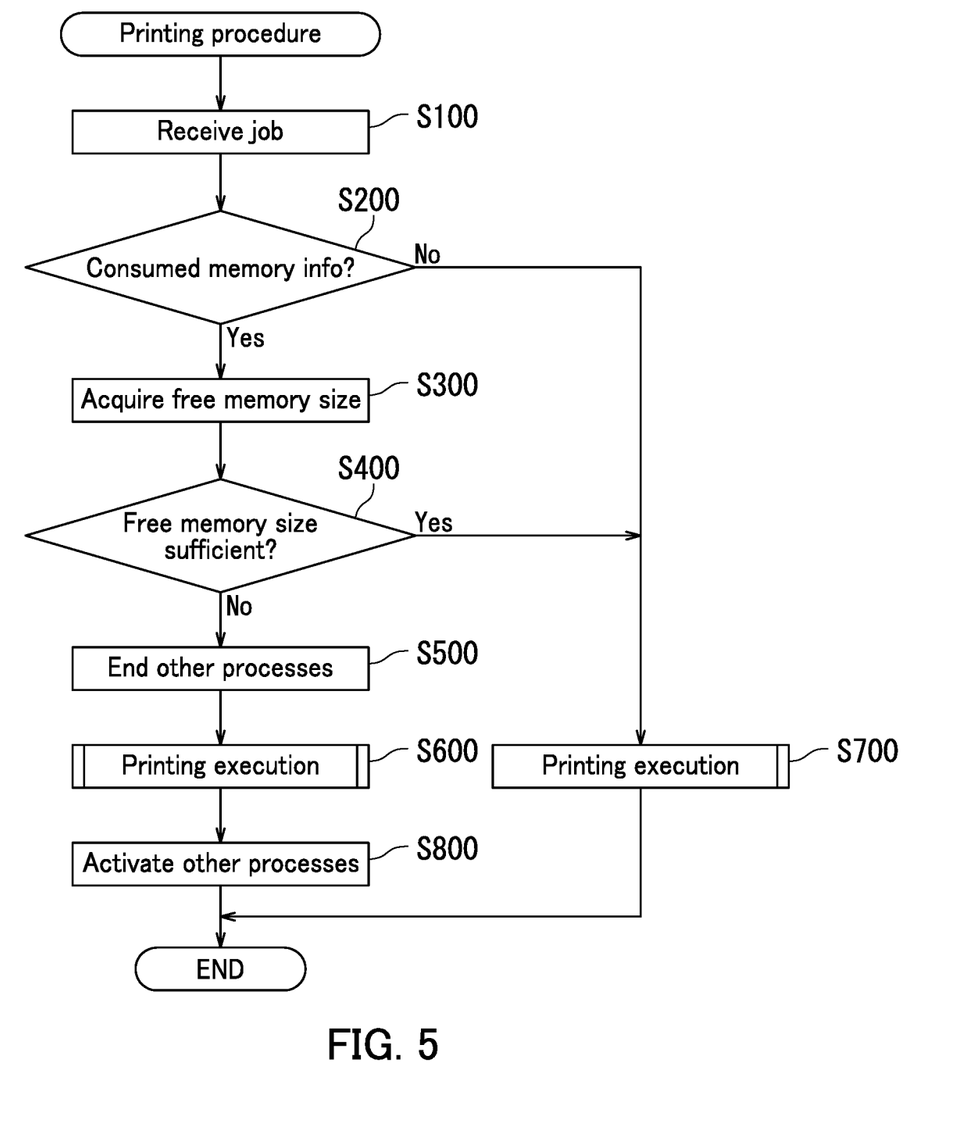
FIG. 5 is a flowchart depicting content of a printing procedure according to the embodiment.

FIG. 5 is a flowchart depicting content of a printing procedure according to the embodiment. In the printing procedure, the image forming apparatus 100 uses the PDL analysis process P1, the color conversion process P2, and the halftone process P3 to form an image on a printing medium (not illustrated) based on a print job received from the personal computer 20 and eject the printing medium. In the present embodiment, it is assumed that a job is generated based on reception of a print job.

In Step S100, the controller 110 receives a print job. In receiving a print job, the CPU activates the PDL analysis process P1, the color conversion process P2, and the halftone process P3 as necessary according to the print job received from the personal computer 20. The PDL analysis process P1, the color conversion process P2, and the halftone process P3 use virtual addresses in virtual memory space to set the storage area. The MMU 112 converts the virtual addresses to physical addresses to secure the physical memory in the main memory 113.

In Step S200, the storage area managing section 111 of the controller 110 searches for consumed memory in the consumed memory information storage area 144 based on attribute information representing job attributes and activation states of the processes P0 and acquires the consumed memory. The consumed memory information is databased by associating the amount of consumed memory with the content of functions such as the printing function F1 and the copy function F2 and the attribute information related to functions such as color/monochrome printing or image resolution (the printing function in this example).

The activation states of the processes P0, that is, information as to whether or not the processes P0 have been activated when the print job is received, may be additionally included in the attribute information. This is because an amount of newly allocated memory decreases once the processes P0 have been activated. The consumed memory information represents a peak value (maximum value) of used memory size during execution of the functions F0.

The storage area managing section 111 advances processing to Step S300 when there is consumed memory information matching the attribute information, or advances processing to Step S700 when there is no consumed memory information matching the attribute information. Note that when data matching the activation states of the processes P0 is not stored in the consumed memory information storage area 144, the storage area managing section 111 may control the processes P0 of the image forming apparatus 100 so as to match data of the activation states stored in the consumed memory information storage area 144 and search for an amount of consumed memory.

In Step S300, the storage area managing section 111 acquires a free memory size. Because a LINUX (registered trademark) kernel is used as an operating system, the free memory size can be acquired using a /proc/meminfo command, for example. In this example, the free memory size is a memory size which is usable by the processes P0.

In the present embodiment, it is assumed that the storage area managing section 111 calculates the free memory size as a sum of an amount of releasable memory aside from an amount of memory preset as an amount of memory that will not excessively reduce processing capacity in the storage area for buffering and file caching, an unused free area, and an amount of memory which is releasable by swapping out data unnecessary for the printing function. However, because swapping out may cause a reduction in the processing capacity of the controller 110, the free memory size may be calculated without assuming swap processing.

In Step S400, the storage area managing section 111 determines whether or not there is a sufficient free memory size for an amount of consumed memory that is an amount of memory represented by the consumed memory information. The storage area managing section 111 advances processing to Step S500 when there is insufficient free memory size, or advances processing to Step S700 when there is sufficient free memory size.

In Step S500, the storage area managing section 111 increases free memory by ending other processes that are unnecessary for the printing function. Specifically, the storage area managing section 111 can end the image reading process P4, the binarization process P5, the compression and decompression process P7, and the PDF conversion process P6, for example. Therefore, the storage area managing section 111 can increase free memory by releasing memory allocated to the image reading process P4, the binarization process P5, the compression and decompression process P7, and the PDF conversion process P6.

Figure 6:
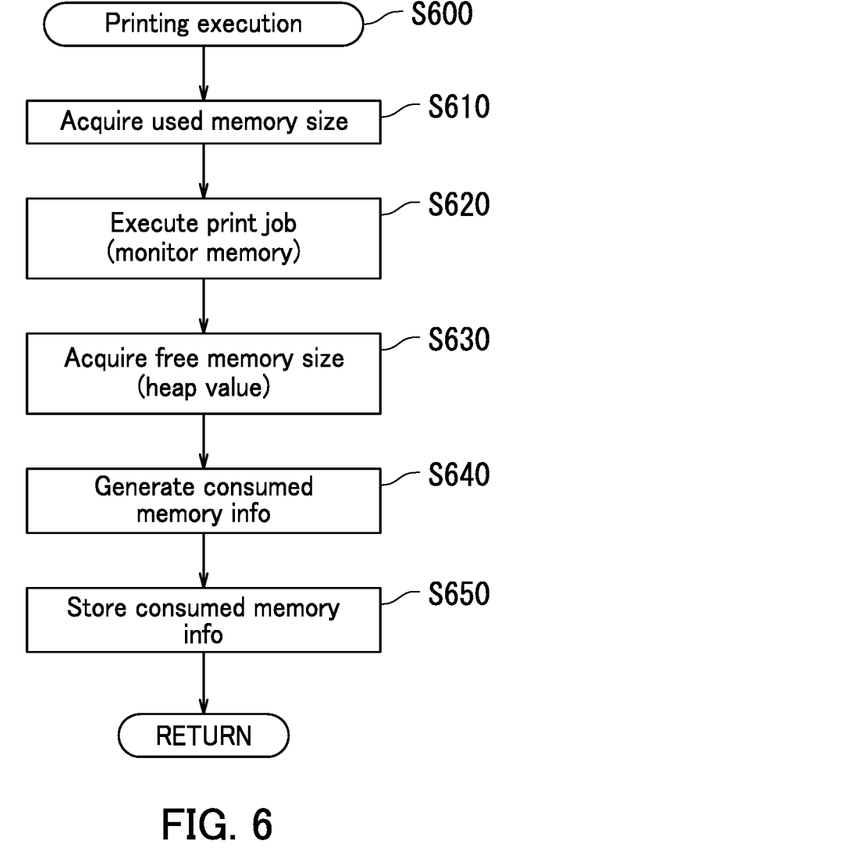
FIG. 6 is a flowchart depicting content of printing execution according to the embodiment.

FIG. 6 is a flowchart depicting content of printing execution according to the embodiment. In Step S600, the controller 110 executes printing. In Step S610, the storage area managing section 111 acquires a used memory size before execution of a print job. The storage area managing section 111 uses the free memory size to calculate a memory size which cannot be used by the processes P0 as the used memory size. The free memory size is calculated using the same content as in Step S300.

In Step S620, the controller 110 causes the PDL analysis process P1, the color conversion process P2, and the halftone process P3 to operate to start execution of the print job. By contrast, the storage area managing section 111 monitors the used memory size in parallel with the processing of the print job.

The PDL analysis process P1 analyzes the print job described in page description language, extracts an object such as text (characters), an image, or a vector graphic included in the print job, and executes drawing processing or font processing. The color conversion process P2 executes color conversion processing to convert RGB image data representing the object to CMYK image data which is reproducible with a coloring material used by the image forming section 160. The halftone process P3 executes processing such as systematic dithering or error diffusion on the CMYK image data and reduces colors to a number of tones that are reproducible by the image forming section 160 with toner dots.

As such, the printing execution consumes a very large amount of memory depending on the content of the print job. Thus, a problem of a memory leak often emerges in the printing execution, which may cause errors or processing delay.

In Step S630, the storage area managing section 111 acquires a peak value (maximum value) of the used memory size in response to completion of the processing of the print job. In Step S640, the storage area managing section 111 generates consumed memory information. Attribute information related to print processing such as color/monochrome printing or image resolution is used to generate the consumed memory information. The consumed memory information may further include activation states of the processes P0, that is, the processes used by the printing function, and information as to whether or not for example the PDL analysis process P1, the color conversion process P2, and the halftone process P3 have been activated when the print job is received.

In Step S650, the storage area managing section 111 stores the consumed memory information. In storing the consumed memory information, the storage area managing section 111 newly registers or updates (updates the maximum value of the consumed memory for example) the consumed memory information to a database in the consumed memory information storage area 144.

Note that Step S700 features the same content as Step S600. The consumed memory information can be stored at time of shipping inspection of the image forming apparatus 100, for example. The image forming apparatus 100 may be configured so as not to use an image forming medium for the purpose of storing the consumed memory information, but have processing for simulating a usage state of the main memory 113, that is, a simulation mode for executing processing until generation of an exposure signal.

In Step S800, the storage area managing section 111 activates the other processes that have been ended to increase free memory. In this example, the storage area managing section 111 activates the image reading process P4, the binarization process P5, the compression and decompression process P7, and the PDF conversion process P6, for example. Therefore, the image reading process P4, the binarization process P5, the compression and decompression process P7, and the PDF conversion process P6 can start quickly in response to generation of a job.

As such, the image forming apparatus 100 according to the embodiment estimates an amount of memory used by the functions (the printing function F1, for example) based on past achievement values, and has high reliability regardless of the memory management method of the operating system. Therefore, the occurrence of problems resulting from insufficient memory can be prevented. Furthermore, when insufficient free memory is predicted based on the past achievement values, the image forming apparatus 100 can also resolve the insufficient memory because other processes not used for target processing are ended in advance to release memory.

The present disclosure is not limited to the above embodiment and can be implemented in variations such as the following.

Variation 1: The storage area managing section 111 in the above embodiment may be configured to restart after completion of all jobs when an unreleased area caused by a memory leak reduces the free memory size to a preset threshold value. In this case, the image forming apparatus 100 can prevent occurrence of problems resulting from insufficient memory caused by a memory leak.

Variation 2: The image forming apparatus in the above embodiment employs a LINUX (registered trademark) kernel as an operating system, but is by no means limited to a LINUX (registered trademark) kernel. The present disclosure is applicable to image forming apparatuses employing other operating systems.

What is claimed is:

1. An image forming apparatus which implements a plurality of functions, the image forming apparatus comprising:
   storage with a prescribed storage area;
   an operating system configured to implement at least some of the functions by allocating a part of the prescribed storage area for a plurality of processes and executing the processes; and
   a storage area managing section configured to predict an amount of consumed memory in response to generation of a job and determine whether or not the amount of consumed memory is allocable to the job in the prescribed storage area, the job being a processing target for the image forming apparatus, the amount of consumed memory being an amount of memory used for processing the job by the image forming apparatus, wherein
   when determining that the amount of consumed memory is not allocable, the storage area managing section ends at least one process which is not used to process the job among the processes to make the amount of consumed memory allocable to the job.

2. The image forming apparatus according to claim 1, further comprising
   non-volatile storage which has a non-volatile storage area, wherein
   the non-volatile storage stores therein the amount of consumed memory and attribute information associated with the amount of consumed memory,
   the attribute information includes attribute information of the job, and the storage area managing section searches for the amount of consumed memory using the attribute information and acquires the amount of consumed memory.

3. The image forming apparatus according to claim 2, wherein
the attribute information further includes activation states of a plurality of specific processes among the processes when the job is generated.

4. The image forming apparatus according to claim 3, wherein
when the activation states of the specific processes are not stored in the non-volatile storage, the storage area managing section controls the specific processes so as to match the activation states stored in the non-volatile storage and searches for and acquires the amount of consumed memory.

5. The image forming apparatus according to claim 2, wherein
the storage area managing section estimates an amount of usable memory on assumption that data which is not used to process the job is swapped out from the storage to the non-volatile storage, and determines that the amount of consumed memory is not allocable when the amount of consumed memory is greater than the amount of usable memory, the amount of usable memory being an amount of memory that is usable to process the job.

6. An image formation method for implementing a plurality of functions using storage with a prescribed storage area, the image formation method comprising:
implementing at least some of the plurality of functions by allocating a part of the prescribed storage area for a plurality of processes and executing the processes;
predicting an amount of consumed memory in response to generation of a job, the amount of consumed memory being an amount of memory used by the image forming method to process the job, the job being a processing target for the image forming method; and
determining whether or not the amount of consumed memory is allocable to the job in the prescribed storage area, wherein
the determining includes, when the amount of consumed memory is determined not to be allocable, ending at least one process which is not used to process the job among the processes to make the amount of consumed memory allocable to the job.

7. A non-transitory computer-readable storage medium storing an image forming program for controlling an image forming apparatus which includes storage with a prescribed storage area and implements a plurality of functions, wherein
the image forming program causes the image forming apparatus to function as
an operating system which implements at least some of the functions by allocating a part of the prescribed storage area for a plurality of processes and executing the processes, and
a storage area managing section which predicts an amount of consumed memory in response to generation of a job and determines whether or not the amount of consumed memory is allocable to the job in the prescribed storage area, the job being a processing target for the image forming apparatus, the amount of consumed memory being an amount of memory used by the image forming apparatus for processing the job, and
when determining that the amount of consumed memory is not allocable, the storage area managing section ends at least one process which is not used to process the job among the processes to make the amount of consumed memory allocable to the job.

* * * * *